July 7, 1959

H. B. BABSON 2,893,407

MILK PIPE LINE WASHING SYSTEM

Filed Dec. 14, 1955

Inventor
Henry B. Babson
By
Schroeder, Hofgren, Brady & Wegner
Attorneys

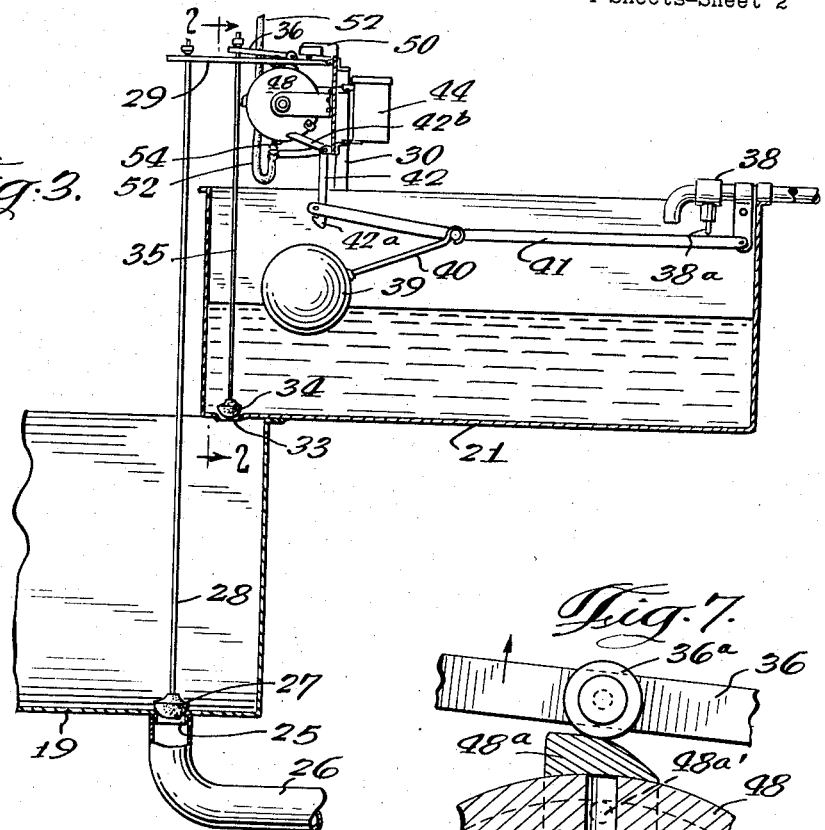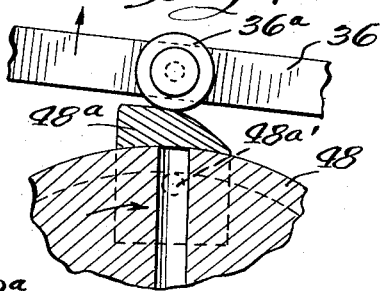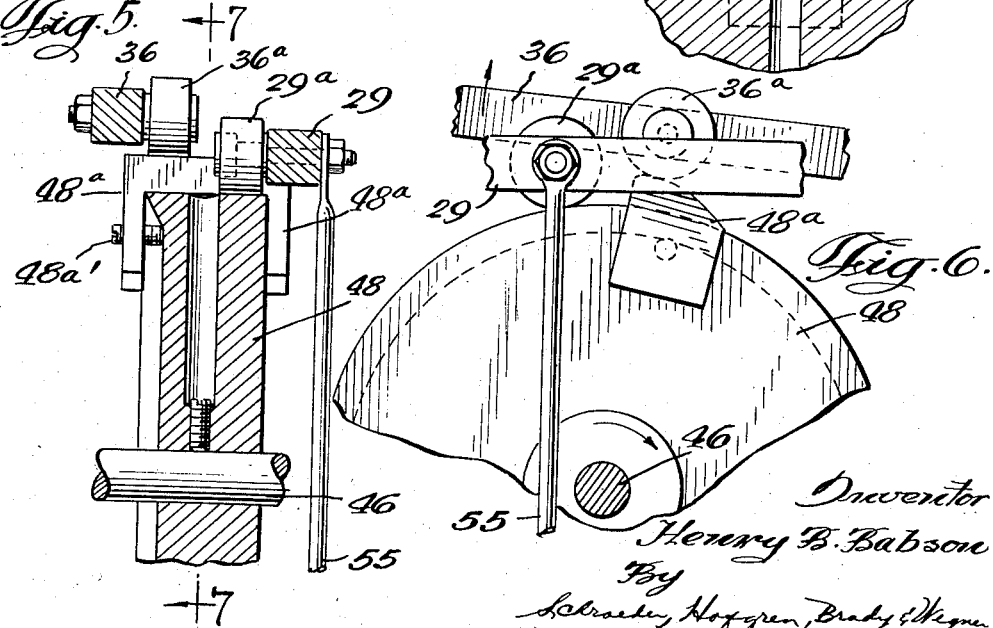

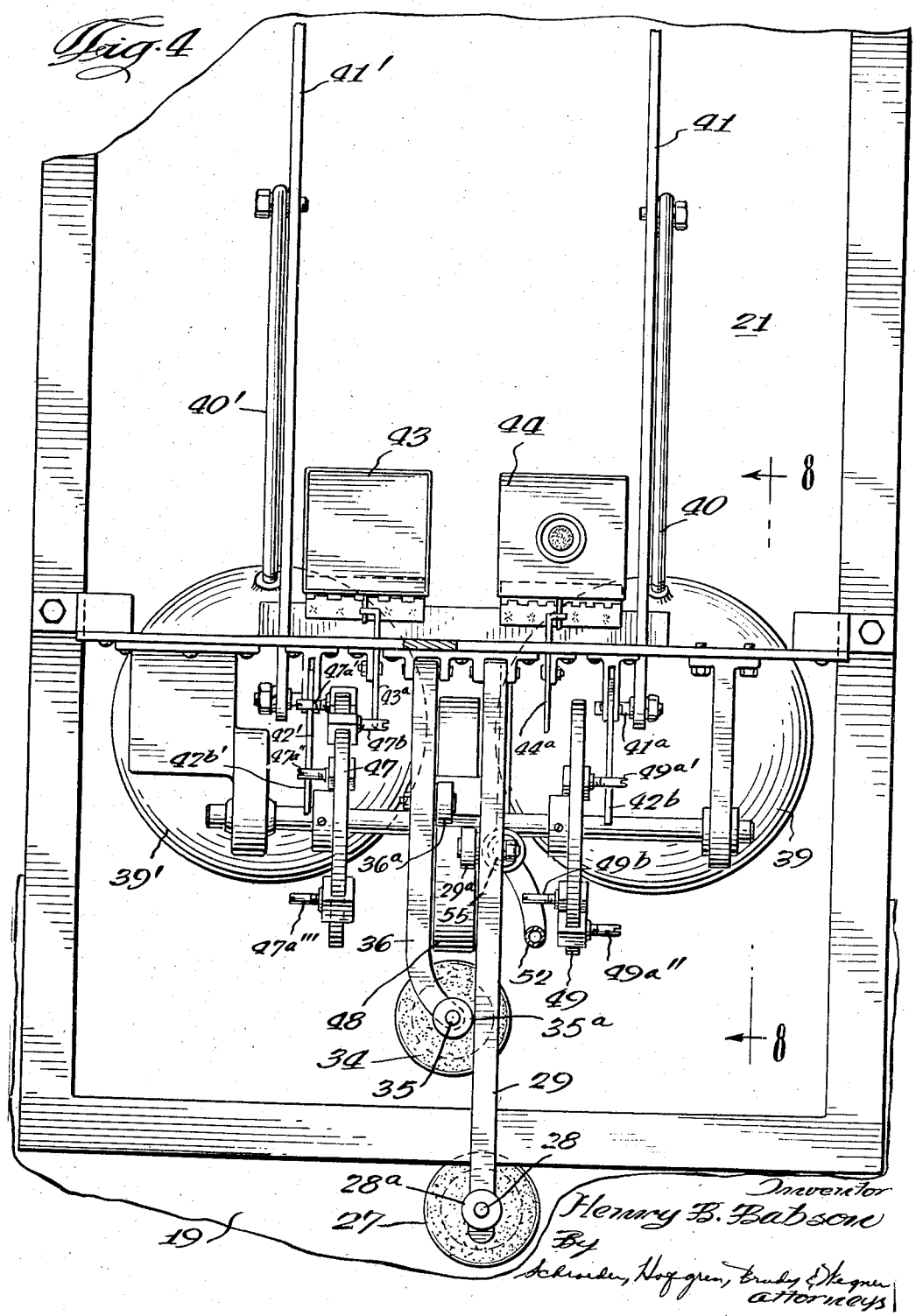

July 7, 1959  H. B. BABSON  2,893,407
MILK PIPE LINE WASHING SYSTEM
Filed Dec. 14, 1955  4 Sheets-Sheet 4

Inventor
Henry B. Babson
By
Schroeder, Hofgren, Brady & Wegner
Attorneys

United States Patent Office 2,893,407
Patented July 7, 1959

2,893,407

MILK PIPE LINE WASHING SYSTEM

Henry B. Babson, Chicago, Ill., assignor to Babson Bros. Co., a corporation of Illinois Application December 14, 1955, Serial No. 553,065

7 Claims. (Cl. 134—56)

This invention is concerned with a carry-away milk pipe line washing system.

A principal object of this invention is the provision of a control unit for a milk pipe line washing system which is primarily mechanical and readily adjustable so that it may easily be adapted in the field to meet the needs of a particular milking system.

A feature of the invention is the provision of a washing system comprising means for circulating a washing solution through the pipe line, a mixing tank, means for preparing additional washing solution in the mixing tank while washing solution is circulating through the pipe line, and means for transferring the additional washing solution from the mixing tank to the pipe line. Another feature is that a washing solution reservoir is connectable with the pipe line and washing solution is circulated from the reservoir through the line, and the control unit includes means for sequentially draining the reservoir and for transferring the additional washing solution from the mixing tank to the reservoir.

A further feature is the provision in a milk pipe line washing system, of a tank for mixing washing solution, a source of liquid for preparing the solution, a valve associated with the source of liquid, a float for closing the valve when the level of solution in the tank reaches a predetermined point and a latch for maintaining the valve closed. Still another feature is that means are provided, including a drain valve, for emptying the tank, and a timer including a rotatable member having a first portion for opening the drain valve to empty the tank and having another portion for tripping the latch to open the liquid valve after the tank is empty.

And a further feature is the method of washing a carry-away milk pipe line, comprising, preparing a first washing solution, circulating the first washing solution through the pipe line, preparing a second washing solution while the first solution is circulating, draining the first solution and circulating the second solution.

Further features and advantages will readily be apparent from the following specification and from the drawings, in which:

Figure 3 is a fragmentary sectional view taken substantially along line 3—3 of Figure 2;

Figure 4 is an enlarged fragmentary top plan view of the mixing tank taken along line 4—4 of Figure 2;

Figure 5 is an enlarged fragmentary sectional view of the drain control;

Figure 6 is a fragmentary side elevational view of the drain control of Figure 5;

Figure 7 is a fragmentary vertical sectional view taken along line 7—7 of Figure 5;

Carry-away pipe line milking systems are becoming more and more popular with dairy farmers, particularly where a large number of animals are to be milked with a minimum of labor. Milk pipe lines, as all milk contacted portions of milking apparatus, must be washed thoroughly immediately after the milking operation. Accepted milking procedure, and many local codes, require that the milking apparatus be rinsed with warm water, washed with a hot detergent solution and then rinsed with a warm sanitizing solution. In the early days of pipe line milkers it was necessary to disassemble the pipe line section by section, rinse, wash and sanitize the various parts by hand, and then reassemble the line. This of course is a difficult and time consuming operation. With the wide-spread use of milk pipe lines, "cleaned in-place" or "CIP" washing systems, i.e. systems in which the pipe lines are washed by circulating washing solutions therethrough, have been developed. The present invention is concerned with an apparatus and method of operating for such a pipe line washing system.

Carry-away milk pipe line systems take many forms, depending on the needs of the particular farmer and the layout of the milking parlor or barn. Similarly, "CIP" washing systems take different forms depending on the nature of the pipe line system. The invention disclosed herein will be described in connection with one particular washing systems. However, the invention may also be used with other types of washing systems.

Figure 1:
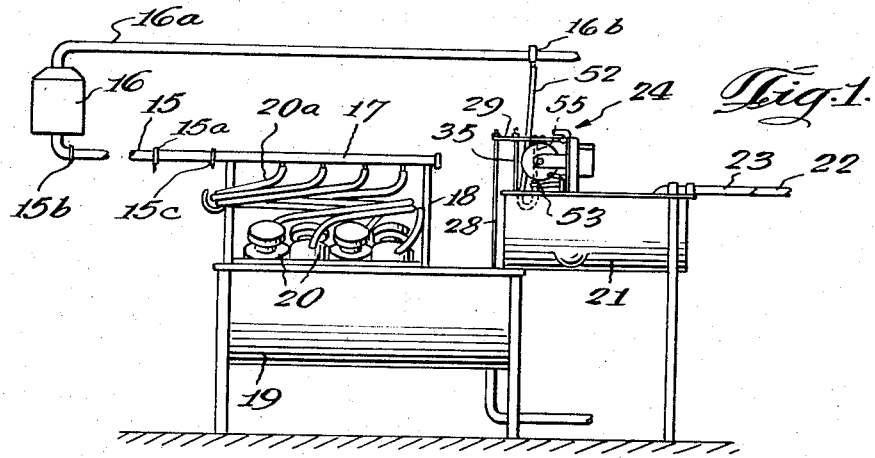
Figure 1 is an elevational view of a pipe line washing system incorporating the invention.

Turning now to Figure 1, a carry-away milk pipe line is diagrammatically illustrated at 15. It will be understood that this pipe line may extend around the periphery of the barn or milking parlor and is provided with a plurality of stall cocks as 15a to which the milk hose of the milking apparatus is connected during milking. The portion 15b of the milk line is capped during milking while the portion 15c may be connected to a source of vacuum and to further milk handling or processing apparatus, as a pump, releaser, cooler or milk tank. After milking has been completed, a flush tank 16 is connected to the portion 15b of the milk line while the portion 15c is connected to a manifold 17 mounted on a rack 18 above a reservoir or tank 19. The flush tank is also connected through pipe 16a with a source of vacuum (not shown). The milk withdrawing units 20 are placed on the rack 18 and milk hoses 20a are connected to the manifold 17. The teat cup units of the milk withdrawing apparatus are permitted to hang downwardly in the reservoir 19. A washing solution mixing tank 21 is mounted above reservoir 19 and has an end portion which projects over the reservoir. Hot and cold water supplies 22 and 23 are provided for the mixing tank and a washing control mechanism 24 is mounted thereon.

Briefly, the operation of the washing system is as follows. A rinsing solution is prepared in mixing tank 21 and then transferred to reservoir 19. The solution circulates through the line 15 and the milk withdrawing units 20 under the control of flush tank 16 which is alternately evacuated and vented to atmosphere. While the pipe line is rinsing, the next or detergent washing solution is prepared in mixing tank 21. After a predetermined rinsing period, reservoir 19 and pipe line 15 are emptied and the detergent washing solution transferred from the mixing tank to the reservoir from which it is circulated through the pipe line. As the detergent solution circulates, the sanitizing solution is prepared in the mixing tank 21, and the pipe line and reservoir are again drained and the final solution transferred thereto for circulation through the pipe line.

Figure 2:
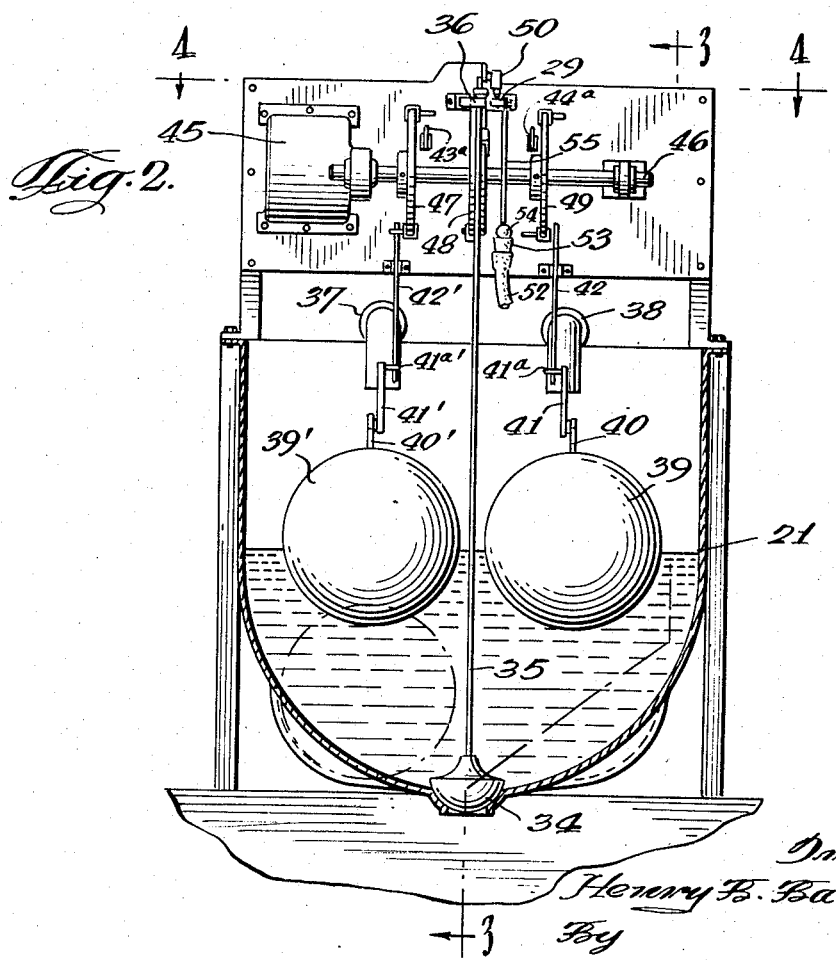
Figure 2 is a transverse vertical sectional view taken through the mixing tank, on line 2—2 of Figure 3.

Turning now to Figures 2, 3 and 4, it is seen that the washing solution reservoir 19 is provided with a drain opening 25 through which the washing solutions may be drained into a waste disposal pipe 26. The drain opening is closed by a drain valve or stopper 27 mounted at the lower end of valve stem 28 which is in turn secured to a drain valve operating arm 29 pivotally mounted on the control unit frame 30. The mixing tank 21 is similarly provided with a drain opening 33 which is closed by a stopper 34 mounted on a stem 35 which is connected to a pivotally mounted arm 36.

At the end of mixing tank 21 opposite the drain, the hot and cold water supplies 22 and 23 terminate in mechanically operated valves 37 and 38. A float control is provided for each of the water valves, the two control mechanisms being identical. As best shown in Figure 3, the cold water control comprises a float 39 mounted on a float rod 40 which in turn is adjustably secured to an intermediate point on pivotally mounted float arm 41. When the mixing tank 21 is emptied and the float is free, the valve 38 is open permitting water to flow into the tank. As the float rises with the water level, float arm 41 engages valve stem 38a and closes the valve. At the same time a pin 41a at the free end of the arm engages the hook portion 42a of a pivotally mounted latch 42 which holds the float in the raised position. The position of float 39 relative to the float arm 41 may be adjusted to control both the level of the solution in the mixing tank and the relative quantities of hot and cold water.

Elements of the hot water valve control mechanism have been assigned the same reference numerals as like elements of the cold water valve control, with the addition of a prime mark; and will not be described in detail.

Two additive containers 43 and 44 are pivotally mounted on the frame 30 and are adapted to hold quantities of desired materials, as a detergent and a concentrated sanitizing solution. Latches 43a and 44a hold the containers 43 and 44, respectively, in upright position. As will appear, these containers are released at the proper time to add their contents to the solution being prepared in the mixing tank.

Figure 8:
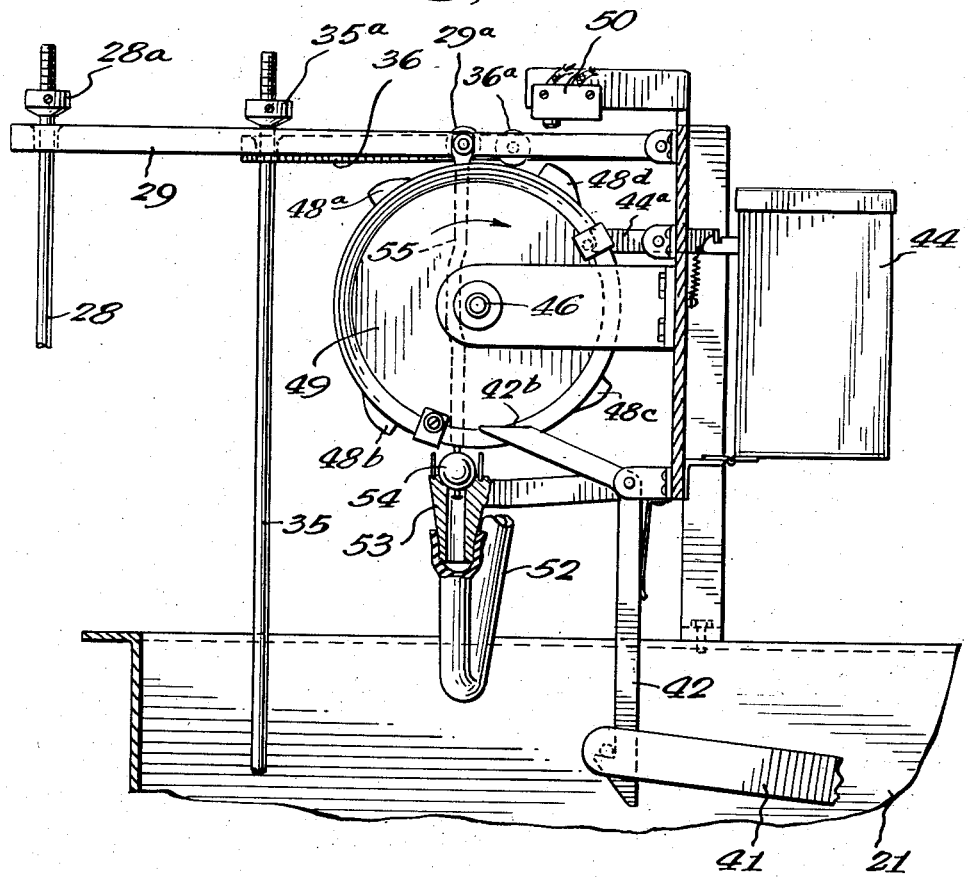
Figure 8 is a fragmentary sectional view taken along line 8—8 of Figure 4.
Figures 9, 10:
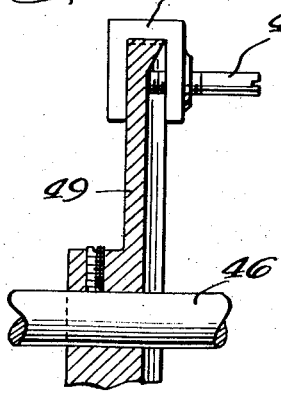
Figure 9 is a fragmentary sectional view of a timer disc.
Figure 10 is a fragmentary side elevational view of a timer disc.

The washing operation is controlled by a timer including a motor 45 mounted on frame 30 and driving a shaft 46 at a relatively slow rate, as one revolution per hour, in a clockwise direction as viewed in Figure 8. Mounted on the shaft are three discs 47, 48 and 49, each of which carries a number of projections or "dogs" which effect the operation of the apparatus as will appear. The projections on the discs 47 and 49 are identical and are best shown in Figures 9 and 10. A U-shaped clamp 49c fits over the edge of the disc 49 and is held in place by a set screw 49a which extends outwardly from the disc. The set screw may be loosened to permit adjustment of the position thereof.

The projections on disc 47 are positioned to release the hot water float control and the detergent container while those associated with disc 49 effect release of the cold water float control and the sanitizer container. The sequence of these operations will be discussed later.

The drain valve arms 29 and 36 for the reservoir and mixing tank drain stoppers are provided with rollers 29a and 36a, respectively, which normally rest on the surface of disc 48. The length of drain valve stems 28 and 35 are adjusted by means of thumb screws 28a and 35a so that the stoppers are seated when the rollers are on the disc surface. The projections, or "dogs," 48a on the disc 48 have a cam or inclined surface which lifts the drain valve arms as the discs turn in a clockwise direction. The roller 29a associated with the reservoir drain valve arm is spaced further away from the mounting of the arms on frame 30 than is roller 36a. This spacing is such that reservoir drain stopper 27 is opened before the mixing tank drain valve 34 and the length of the cam surface is sufficient to permit the reservoir and pipe line to empty. The reservoir drain then closes and the mixing tank drain opens to transfer the contents thereof to the reservoir, and thus to the pipe line. A switch 50 is associated with reservoir drain valve arm 29 and is closed when this arm is in its lower-most condition. This switch may be connected in the power circuit of the means utilized for circulating the washing solution through the pipe line, as the vacuum pump (not shown) utilized in the flush-type system of Figure 1.

Vacuum line 16a is vented when reservoir drain valve 27 is lifted to speed emptying of the line. A hose 52 is connected to a stall cock 16b on pipe 16a and to a nipple 53 mounted on control unit frame 30. A ball check valve 54 is carried at the end of an arm 55 connected to reservoir drain valve arm 29. Thus, when the drain valve opens, ball 54 is lifted and vacuum line 16a opened to atmosphere. After the line has drained, and the drain valve reseats, ball 54 again closes nipple 53.

The operation of the washing system may proceed generally as follows. As the timer motor starts, the drain valves are closed and screws 47a' and 49a' both strike the upper portion 42b' and 42b, respectively, of float latches 42' and 42. This releases both of the floats and opens the hot and cold water valves. The water continues to flow into the mixing tank until the floats rise far enough to close the water supply valves, the float arms at the same time engaging their respective latches. The first cam 48a on disc 48 lifts reservoir drain valve stopper 27, but this has no effect as the reservoir is empty. After the reservoir drain valve is closed, mixing tank drain stopper 34 is opened permitting the contents of the drain tank to empty into reservoir 19.

As the timing discs continue to turn, a second projection 47a'' trips latch 42', releasing float 39' opening the hot water valve 37. Shortly thereafter projection 47b on the other side of disc 47 trips catch 43a releasing detergent container 43 which empties its contents into mixing tank 21. Again, as the level of the solution in the mixing tank reaches the desired point hot water valve 37 is closed and hot water float arm 41' latched in the raised position. When the rinsing solution has circulated for the desired period of time drain valve stoppers 27 and 34 are again sequentially opened, by dog 48b, the rinsing solution drained from the pipe line and reservoir and the detergent washing solution transferred thereto. Projections 47a'' and 47b are of course so positioned that the detergent washing solution is prepared when it is needed and does not sit in the mixing tank for an excessive period of time, which would cool it.

After the detergent solution empties from mixing tank 21 projections 47a''' and 49a'' trip the associated latches 42' and 42, releasing both of the float assemblies and permitting the hot and cold water valves to open. Shortly thereafter a projection 49b on disc 49 strikes latch 44a associated with sanitizer container 44, emptying the sanitizing solution into the mixing tank. After the preparation of the sanitizing solution has been completed, a third dog 48c on timer disc 48 opens reservoir drain valve 25 draining the detergent solution, and then opens mixing tank drain 33 transferring the sanitizing solution to the reservoir. When the sanitizing solution has circulated for the desired period of time, reservoir drain 25 is again opened by a fourth dog 48d draining the system and terminating the washing cycle.

The position of floats 39 and 39' relative to float arms 41 and 41', and the relative positions of the various projections and cams on discs 47, 48 and 49 may all readily be adjusted to control both the timing of the washing operation and the composition of the solutions.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. A milk pipe line washing system of the character described, comprising: means providing a source of water; means providing a supply of additive material; means for mixing said water and additive material for preparing a washing solution; means for circulating the washing solution through the pipe line; mechanical means for effecting operation of said water source and mixing means, and including latch means retaining said water source and mixing means in inoperative condition; and a control for said mechanical means including control portions for tripping said latch means to render operative said water source and mixing means, said control portions being readily adjustable in the field.

2. A control arrangement of the character described for a carry-away milk pipe line washing system comprising: a reservoir connected to said pipe line and having a drain opening therein; a closure for said reservoir drain opening; means for circulating a washing solution from said reservoir through said pipe line; a mixing tank mounted above said reservoir, said tank having a drain opening for transferring the contents thereof to said reservoir; a closure for said mixing tank drain opening; a source of water, including valve means; float control means for said valve means; latch means for maintaining said float controlled valve means in closed position; a releasable additive container mounted above said mixing tank; and a timer comprising a rotatable member having a first portion for effecting the sequential opening and closing of said reservoir and mixing tank drains, a second portion for effecting release of said valve latch means, and a third portion for effecting release of said additive container.

3. The control arrangement as set forth in claim 2, wherein said timer portions are adjustable.

4. A control arrangement as set forth in claim 2, wherein said timer comprises a rotatable shaft, a plurality of discs carried on said shaft and said portions are projections adjustably mounted on said discs.

5. In a milk pipe line washing system: a tank for mixing washing solution; a source of liquid for preparing said solution; a valve connected with said source of liquid; means responsive to the level of solution in the tank for closing said valve when the level reaches a predetermined point; and a latch for maintaining said valve closed, regardless of the level of liquid in said tank.

6. In a milk pipe line washing system: a tank for washing solution; a source of liquid for preparing said solution; a valve connected with said source of liquid; a pivotally mounted float arm; a float carried by said arm, said arm closing said valve when the level of water in the tank reaches a predetermined point; a latch for maintaining said float arm in raised position; and a timer including a rotatable member having a portion engageable with said latch to release said float arm.

7. In a milk pipe line washing system: a tank for washing solution; a source of liquid for preparing said solution; a valve connected with said source of liquid; a float for closing said valve when the level of solution in the tank reaches a predetermined point; a latch for maintaining said valve closed; means for emptying said tank, including a drain valve; and a timer including a rotatable member having a first portion for opening said drain valve to empty the tank, and having another portion for tripping said latch to open said liquid valve after said tank is empty.

References Cited in the file of this patent

UNITED STATES PATENTS

| | | |
|---|---|---|
| 2,030,092 | Benson | Feb. 11, 1936 |
| 2,038,260 | Ash | Apr. 21, 1936 |
| 2,057,286 | Ash | Oct. 13, 1936 |
| 2,215,018 | Schmitt | Sept. 17, 1940 |
| 2,442,835 | Allen | June 8, 1948 |
| 2,680,445 | Hemminger | June 8, 1954 |
| 2,699,792 | Fisher | Jan. 18, 1955 |